US010503725B2

(12) United States Patent
Sharp

(10) Patent No.: US 10,503,725 B2
(45) Date of Patent: Dec. 10, 2019

(54) DECENTRALIZED DISTRIBUTED DATABASE CONSISTENCY

(71) Applicant: Futurewei Technologies, Inc., Plano, TX (US)

(72) Inventor: Mason Sharp, Holmdel, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 414 days.

(21) Appl. No.: 15/373,240

(22) Filed: Dec. 8, 2016

(65) Prior Publication Data

US 2018/0107703 A1 Apr. 19, 2018

Related U.S. Application Data

(60) Provisional application No. 62/407,838, filed on Oct. 13, 2016.

(51) Int. Cl.
*G06F 16/23* (2019.01)
*G06F 9/46* (2006.01)

(52) U.S. Cl.
CPC ............ *G06F 16/2365* (2019.01); *G06F 9/46* (2013.01); *G06F 16/2379* (2019.01)

(58) Field of Classification Search
CPC ..... G06F 16/2365; G06F 16/2379; G06F 9/46
(Continued)

(56) References Cited

U.S. PATENT DOCUMENTS

2008/0243865 A1\* 10/2008 Hu .......................... G06F 16/27
2011/0041006 A1\* 2/2011 Fowler .................... G06F 9/466
714/10
(Continued)

FOREIGN PATENT DOCUMENTS

| CN | 103116596 A | 5/2013 |
| CN | 105608086 A | 5/2016 |
| EP | 2595068 A2 | 5/2013 |

OTHER PUBLICATIONS

Binning, C. et al., "Distributed snapshot isolation: global transactions pay globally, local transactions pay locally", The VLBD Journal 23:987-1011, Springer-Verlag Berlin Heidelberg, Jun. 18, 2014, 25 pages, XP058062350.
(Continued)

*Primary Examiner* — Evan Aspinwall
(74) *Attorney, Agent, or Firm* — Slater Matsil, LLP

(57) ABSTRACT

A method for maintaining consistency in distributed databases includes receiving, by a coordinator from an application server, a transaction initiation message for a transaction. Additionally, the method includes determining whether to generate a distributed transaction identifier (DXID) for the transaction, including determining whether the transaction will be performed on a single data node or on multiple data nodes, determining to generate the DXID in response to determining that the transaction will be performed on the multiple data nodes, and generating, by the coordinator, the DXID corresponding to the transaction in response to determining to generate the DXID for the transaction. The method also includes sending, by the coordinator directly to a first data node, the DXID, sending, by the coordinator directly to a second data node, the DXID, and performing the transaction using the DXID.

20 Claims, 8 Drawing Sheets

(58) Field of Classification Search
USPC .......................................................... 707/690
See application file for complete search history.

(56) References Cited

U.S. PATENT DOCUMENTS

| | | |
|---|---|---|
| 2013/0124475 A1 | 5/2013 | Hildenbrand et al. |
| 2014/0279986 A1 | 9/2014 | Mupparti et al. |
| 2015/0120645 A1* | 4/2015 | Varakur .............. G06F 16/2379 |
| | | 707/607 |
| 2015/0261563 A1 | 9/2015 | Guerin et al. |
| 2015/0319265 A1 | 11/2015 | DeRoo et al. |

OTHER PUBLICATIONS

Lee, J. et al., "SAP HANA Distributed In-Memory Database Syatem: Transaction, Session, and Metadata Management", ICDE Conference 2013, 9 Pages, XP032430946.

* cited by examiner

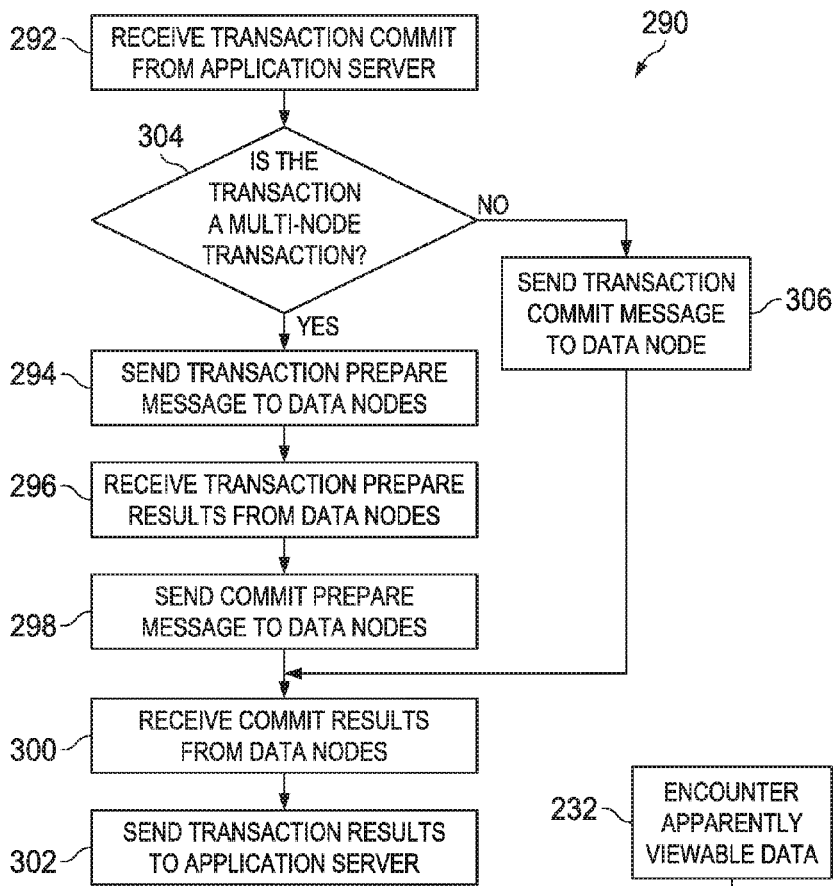
FIG. 4
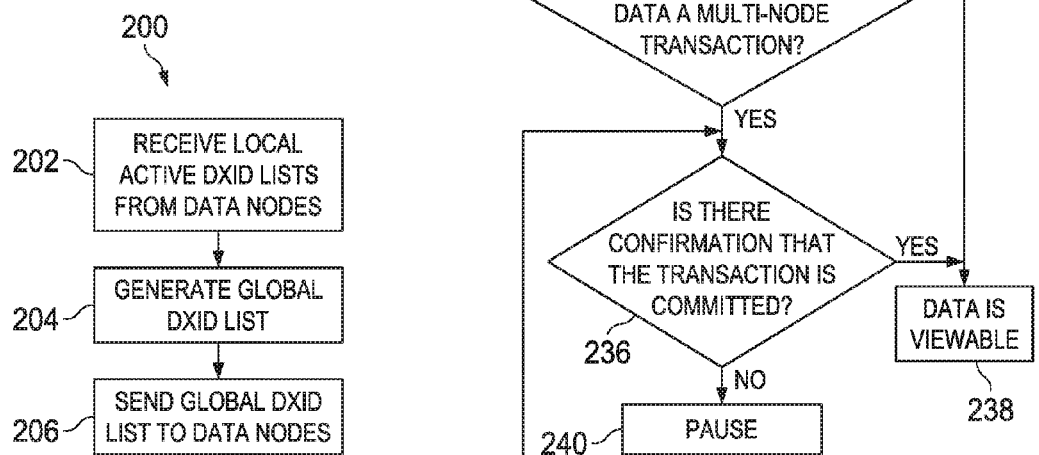
FIG. 5
FIG. 6

DECENTRALIZED DISTRIBUTED DATABASE CONSISTENCY

CROSS-REFERENCE TO RELATED APPLICATIONS

This application claims the benefit of U.S. Provisional Application No. 62/407,838, filed on Oct. 13, 2016, which application is hereby incorporated herein by reference.

TECHNICAL FIELD

The present invention relates generally to a system and method for databases, and, in particular embodiments, to a system and method for maintaining consistency in distributed databases.

BACKGROUND

Distributed database systems may include many data nodes working together to perform transactions. Different data nodes are coordinated to perform a transaction, with different nodes working on different transactions or different aspects of a transaction. Some database transactions are performed on multiple data nodes, which may lead to consistency anomalies. For example, a task may be committed by one data node but not on other data nodes at a particular time, during which another concurrent transaction may access those same data nodes and only see partially committed data. When a concurrent transaction is performed on multiple data nodes, it is desirable for the transaction to have a consistent view of the data on all data nodes of a transaction.

When a transaction involving multiple servers is committed, a two-phase commit may be conducted to ensure that the processing of the transaction on all the servers is completed. A global transaction manager (GTM) supports atomicity, consistency, isolation, and durability (ACID) compliant transactions in distributed databases. The GTM provides a global transaction identification number (ID) to uniquely identify a transaction in the system. Database systems such as Gauss massively parallel processing database (MPPDB), Postgres-XC, and Postgres-XL use a centralized GTM to prevent consistency anomalies.

SUMMARY

In accordance with an embodiment of the present invention, a method for maintaining consistency in distributed databases includes receiving, by a coordinator from an application server, a transaction initiation message for a transaction. Additionally, the method includes determining whether to generate a distributed transaction identifier (DXID) for the transaction, including determining whether the transaction will be performed on a single data node or on multiple data nodes, determining to generate the DXID in response to determining that the transaction will be performed on the multiple data nodes, and generating, by the coordinator, the DXID corresponding to the transaction in response to determining to generate the DXID for the transaction. The method also includes sending, by the coordinator directly to a first data node, the DXID, sending, by the coordinator directly to a second data node, the DXID, and performing the transaction using the DXID.

In accordance with another embodiment of the present invention, a method for maintaining consistency in distributed databases includes receiving, by a data node from a coordinator, an operation assignment message for an operation of a first transaction, generating a local snapshot by the data node, and determining whether to perform DXID management. The method also includes performing distributed transaction identifier (DXID) management in response to determining to perform DXID management, including receiving, by the data node from the coordinator, a DXID corresponding to the first transaction and mapping the DXID to a local transaction identifier (XID) for the first transaction. Additionally, performing DXID management includes generating a list of active DXIDs on the data node and sending, by the data node to the coordinator, the list of active DXIDs. Also, performing DXID management includes receiving, by the data node from the coordinator, a list of globally active DXIDs and updating a local snapshot in accordance with the list of globally active DXIDs.

In accordance with an additional embodiment of the present invention, a coordinator for maintaining consistency in distributed databases includes a non-transitory memory storage including instructions and one or more processors in communication with the memory. The one or more processors execute the instructions to receive, from an application server, a transaction initiation message for a transaction. Additionally, the one or more processors execute the instructions to determine whether to generate a distributed transaction identifier (DXID) for the transaction, including instructions to determine whether the transaction will be performed on a single data node or on multiple data nodes and determine to generate the DXID in response to determining that the transaction will be performed on the multiple data nodes. The one or more processors also execute instructions to generate the DXID corresponding to the transaction in response to determining to generate the DXID for the transaction and send the DXID directly to a first data node. Also, the one or more processors execute instructions to send, directly to a second data node, the DXID and perform the transaction using the DXID.

In accordance with another embodiment of the present invention, a data node for maintaining consistency in a distributed database, including a non-transitory memory storage including instructions and one or more processors in communication with the memory. The one or more processors execute the instructions to receive, from a coordinator, an operation assignment message for an operation of a first transaction, generate a local snapshot, and determine whether to perform DXID management. The instructions also include instructions to perform distributed transaction identifier (DXID) management in response to determining to perform DXID management, including receive, from the coordinator, a DXID corresponding to the first transaction, map the DXID to a local transaction identifier (XID) for the first transaction, and generate a list of active DXIDs on the data node. Additionally, the instructions to perform DXID management include instructions to send, to the coordinator, the list of active DXIDs, receive, from the coordinator, a list of globally active DXIDs, and update a local snapshot in accordance with the list of globally active DXIDs.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 illustrates a flowchart for an embodiment method of transaction committing performed by a coordinator;

FIG. 5 illustrates a flowchart for an embodiment method of snapshot coordination performed by a coordinator;

FIG. 6 illustrates a flowchart for an embodiment method of viewing data, performed by a data node;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
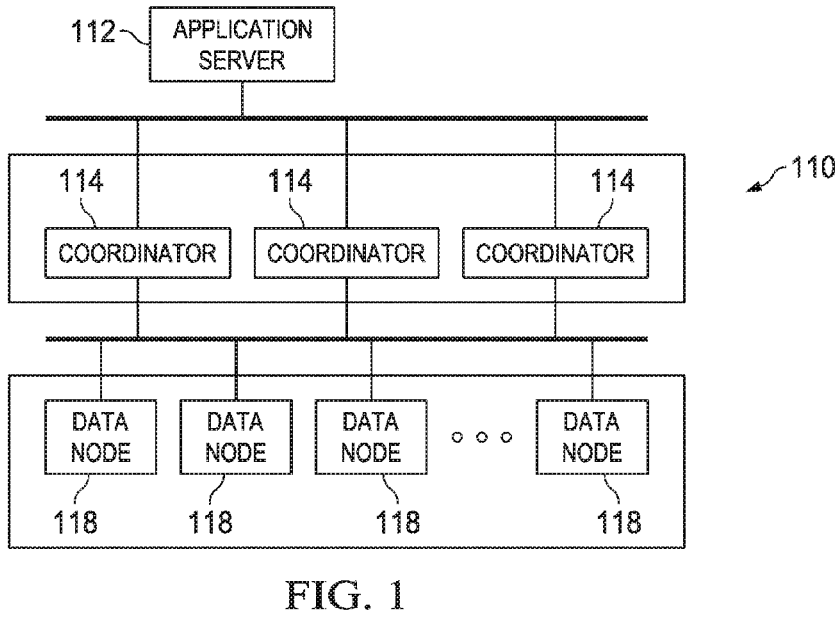
FIG. 1 illustrates an embodiment distributed database system.

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the exemplary designs and implementations illustrated and described herein, but may be modified within the scope of the appended claims along with their full scope of equivalents.

A concurrent transaction should either be able to view all of another transaction's committed data, or none of it, but not some of it. Thus, a mechanism is needed to coordinate a transaction and to ensure a consistent view of the data across multiple nodes.

Distributed database systems may include multiple data nodes. For example, massively parallel processing (MPP) involves a very large number of data nodes. Different data nodes may perform different transactions. Some database transactions are performed on multiple data nodes, which may lead to consistency anomalies. For example, a transaction may be committed on one data node but not on other data nodes at a particular time. It is desirable for transactions to either be visible on all data nodes or to be visible on no data nodes, to ensure consistency. Without introducing mechanisms to ensure consistency, when data is seen as committed on one data node but not on another data node, the data may be seen in the current operation of a concurrent transaction, and then not seen in the next operation. In an embodiment, consistency is accomplished by using a distributed transaction identifier (DXID). In addition, a global transaction manager (GTM) may be used to ensure consistency among multiple data nodes in a distributed database.

The load balancer is coupled to the coordinators. The coordinators, which run on one or more servers, coordinate the user session and interact with the GTM and the data nodes. The coordinator receives a transaction from an application. Some example applications are a bank and an automated teller machine (ATM), system logging, phone call billing systems, experimental data, and other applications involving large amounts of data. The transactions register with the GTM. Transaction operations may include, for example, start, end, commit, rollback, and abort. When a transaction begins, the coordinators request a global transaction identifier (GXID) from the GTM. In some embodiments, the GXID is only used for write transactions, and is not used for read transactions. The coordinators receive a GXID from the GTM for the transaction. In response, the coordinators receive a snapshot from the GTM. The coordinators send the transaction, the timestamp, the snapshot, and the GXID to the data nodes.

The data nodes store data and perform the transactions. The data nodes receive a transaction initiation message, a timestamp, and a GXID from the coordinators. When a transaction is completed, the results are sent to the coordinators, and the transaction is committed.

Online transaction processing (OLTP) systems may facilitate and manage transaction-oriented applications, for example data entry and retrieval. Examples of OLTP systems include order entry, retail sales, and financial transaction systems. In some examples, OLTP systems have workloads with many small transactions that may be performed on a single data node.

The use of a GTM as a standalone device may cause a bottleneck, especially as the number of data nodes increase when databases scale up in size. The number of messages exchanged between the coordinators and the GTM may be significant, and may increase as the database size increases. The disclosed embodiments provide for a system where transactions which solely occur on one node do not need to access a GTM.

An embodiment uses a coordinator to generate a DXID for distributed transactions. In an embodiment, a DXID is only generated for write transactions, and is not generated for read transactions, which ensures consistency in a distributed database while reducing the bandwidth and enhancing scalability. In an embodiment, a DXID is only generated for transactions which are performed on multiple data nodes. In an embodiment, the coordinators only send the DXID to data nodes involved in the transaction, reducing the use of bandwidth and enhancing scalability. The data nodes use the DXID to globally identify the transaction. The participating data nodes map the DXID to a local transaction ID (XID). In an embodiment, a cloud database may use a DXID generated by coordinators. The use of a global DXID ensures a consistent view of the database, so that the results of transactions are either viewable or not viewable across different data nodes involved in the same transaction. Performing coordination when needed ensures a consistent view of the distributed database without the use of a centralized component. Thus, a bottleneck from a GTM may be avoided, which enhances scalability. For some OLTP workloads with many transactions being performed only on a single data node, scalability may be improved for higher concurrency workloads. In an embodiment, data becomes visible upon a commit for single data node transactions. When data from a multi-node transaction has been committed on one data node, but not yet confirmed to be committed on all data nodes, the database system pauses when the involved data is concurrently accessed until confirmation is received from other nodes, preventing inconsistencies.

FIG. 1 illustrates the distributed database system 110, in which the coordinators 114 generate a DXID for distributed transactions. A client application runs on the application server 112. The client application may be, for example, a bank, an ATM, system logging, phone call billing systems, experimental data, data entry, data retrieval, order entry, retail sales, a financial transaction system, or another application involving a large amount of data. In one embodiment, the client application is an OLTP application.

The application server 112 communicates with the coordinators 114. Three coordinators 114 are pictured, but there may be any number of coordinators 114, including only one or two coordinator 114, or many coordinators 114, for example 4, 5, 6, or more coordinators 114. The application server 112 initiates a transaction on the distributed database system 110 to the coordinators 114. In some examples, the application server 112 receives a transaction request from a user through a wired or wireless connection, where the user may be remote. The application server 112 receives a transaction reply from the coordinators 114. Then, the application server 112 initiates an operation on the coordinators 114. The coordinators 114 assign the operation to one or more than one of data nodes 118 based on the resource requirement of the operation and the resources available on the data nodes 118. Some operations are performed on a single data node 118, while other operations are performed multiple data nodes 118. In one embodiment, performing an operation on a single data node 118 is preferred to performing the operation on multiple data nodes 118.

The coordinators 114 send transaction initiation messages to the one or more data nodes 118 participating in the transaction. The coordinators generate a unique DXID corresponding to the transaction. The coordinators send this DXID to the data nodes 118 involved in the transaction. In one embodiment, the DXID is only sent to the data nodes 118 participating in the transaction. In an embodiment, a DXID is only generated for multi-node transactions, and is not generated on single-node transactions. In an embodiment, a DXID is generated for write operations only, and is not generated for read operations. In an embodiment, a DXID is generated only for the first multi-node write operation of a transaction.

The data nodes 118 participating in the transaction receive the transaction initiation messages from the coordinators 114. For transactions involving more than one data node, the data nodes also receive the DXID from the coordinators 114. A local transaction ID (XID) is generated in each of the participating data nodes 118. The participating data nodes 118 map the DXID to the local XID. Also, the participating data nodes 118 prepare local snapshots, which list current active transactions in which that that particular data node is participating. The current transaction is added to the local snapshot. The data nodes 118 track the DXIDs for current and recently committed transactions. The data nodes 118 send their list of active DXIDs to the coordinator 114 which originated the transaction over a shared communication medium. The transaction originating coordinator 114 tracks a combined global list of DXIDs from all of the data nodes involved in multi-node transactions. The coordinator 114 sends the global list of DXIDs to the data nodes 118. The data nodes 118 then update their snapshots, or list of non-visible transactions, to include the corresponding transactions which have not yet committed on other nodes. The data nodes 118 use the global list of DXIDs to determine which transactions are active on other data nodes 118.

The coordinators 114 send operation initiation messages to the data nodes 118. The data nodes 118 perform the operation. The data nodes 118 send the operation results to the coordinators 114. The coordinators 114 then send the operation results to the application server 112.

For multi-node transactions, a two phase commit is performed. The application server 112 sends a transaction commit message to the coordinators 114, which send transaction prepare messages to the data nodes 118. The data nodes 118 prepare for committing, and send prepare result messages to the coordinators 114. When the coordinators 114 receive prepare results from all of the data nodes 118, the coordinators 114 send commit prepared messages to the data nodes 118. The data nodes 118 commit the transaction, and send commit results to the coordinators 114. Then, the coordinators 114 send transaction results to the application server 112.

For single data node transactions, the coordinator 114 sends a commit message to a data node 118. The data node 118 commits the transaction, and sends the commit results to the coordinator 114. Then, the coordinator 114 sends the transaction results to the application server.

In one embodiment, DXIDs are only generated for some transaction types. Table 1 below illustrates the situations in which DXID generation and DXID snapshots are used. The coordinator determines whether the transaction will be a single node transaction or a multi-node transaction, based on the location of the data and on the availability of the data node. In an embodiment, the coordinator prefers a single data node transaction over a multi-node transaction. For example, the coordinator will schedule a transaction on a single data node when the resources to perform that transaction on a single data node are available. DXIDs are neither generated nor used for single data node transactions. DXID snapshots are used for both multi-node read transactions and multi-node write transactions, but are not used for either single data node read transactions or single data node write transactions in some embodiments. In this embodiment, DXIDs are only generated for multi-node write transactions, and are not generated for read transactions or for single data node transactions. In another embodiment, DXIDs are used but not generated for multi-node read transactions. Generating a DXID only when necessary, for multi-node write transactions, reduces the number of communications required. Read transactions do not need to generate a DXID, because there is no commit performed.

TABLE 1

| Node Quantity | Transaction Type | Generate DXID | Use DXID snapshots |
|---|---|---|---|
| Single Data Node | Read | No | No |
| Single Data Node | Write | No | No |
| Multi-node | Read | No | Yes |
| Multi-node | Write | Yes | Yes |

TABLE 2

| Transaction 1 Node 1 State | Transaction 1 Node 2 State | Data Viewable by Transaction 2? | Snapshot Amended? | Pause Read Until Confirmed Committed |
|---|---|---|---|---|
| Uncommitted | Uncommitted | No | No | No |
| Uncommitted | Committing | No | No | No |
| Uncommitted | Committed | No | Yes | No |
| Committing | Committing | Yes | No | Yes |
| Committing | Committed | Yes | No | Yes |
| Committed | Committed | Yes | No | No |

Table 2, above, illustrates how snapshots may be used to prevent anomalies in a variety of situations. Transaction 1 is performed on data node 1 and data node 2. In some situations, concurrent operations are paused by the data nodes when the pending write transaction will soon be committed on all data nodes, but has not yet been committed on all data nodes. An operation is paused when a data node attempts to view apparently viewable data, and that data node pauses the operation until it receives confirmation that the data has been committed on all data nodes. When transaction 1 is uncommitted on both data nodes, or is uncommitted on one data node and is in the process of committing on the other data node, the data is not viewable by other transactions. The snapshot is not amended and read transactions are not paused until confirmation that the transaction has been committed is received. When the transaction is uncommitted on one data node and committed on the other data node, the data is not viewable by other transactions, and read transactions are not paused until confirmation of the commit is available, but the snapshot is amended. Also, when the transaction is in the process of committing on both data nodes, or is committed on one data node and in the process of being committed on the other data node, the data is viewable by other transactions and concurrent access to the same data is paused until it is confirmed that the transaction has been committed on both data nodes, but the snapshot is not amended. Additionally, when the transaction is committed on both data nodes, the data is viewable by other transactions, the snapshot is not amended, and concurrent transactions accessing that data are not paused until it is confirmed that the transaction has been committed.

Figure 2:
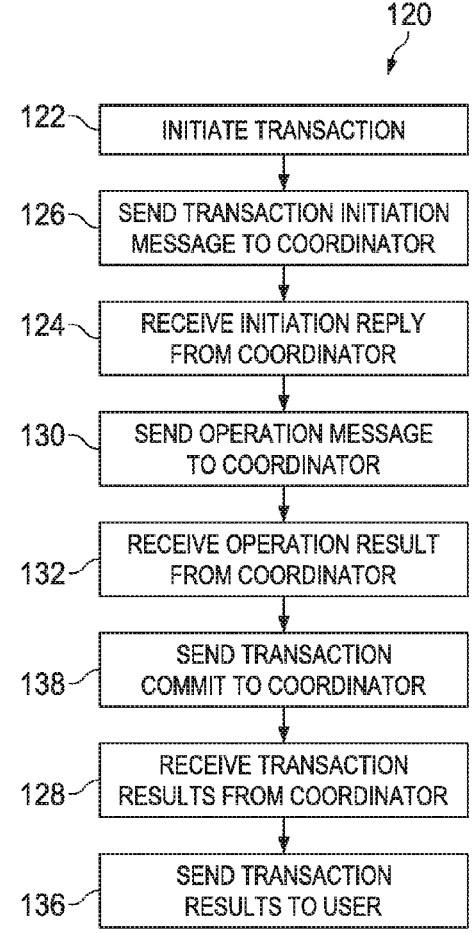
FIG. 2 illustrates a flowchart for an embodiment method of distributed database coordination performed by an application server.

FIG. 2 illustrates a flowchart for an embodiment method 120 of coordination in a distributed database performed by an application server. In block 122, the application server initiates a transaction. In one embodiment, the application server receives a transaction from an external user, either directly or remotely. In another embodiment, an application running on the application server generates the transaction. In block 126, the application server initiates processing of a transaction by sending a transaction initiation message to one of the coordinators. In response, the application server receives an initiation reply message from the coordinator, in block 124

In block 130, the application server sends an operation message to the coordinator, such as a query, or a statement, such as an insert, update, or delete statement. In response, the application server receives an operation result from the coordinator, in block 132.

In block 138, the application server sends a transaction commit message to the coordinator. In response, in block 128, the application server receives the transaction results from the coordinator. Optionally, in block 136, the application server sends the results to a user. The user may be directly or remotely connected to the application server.

Figure 3:
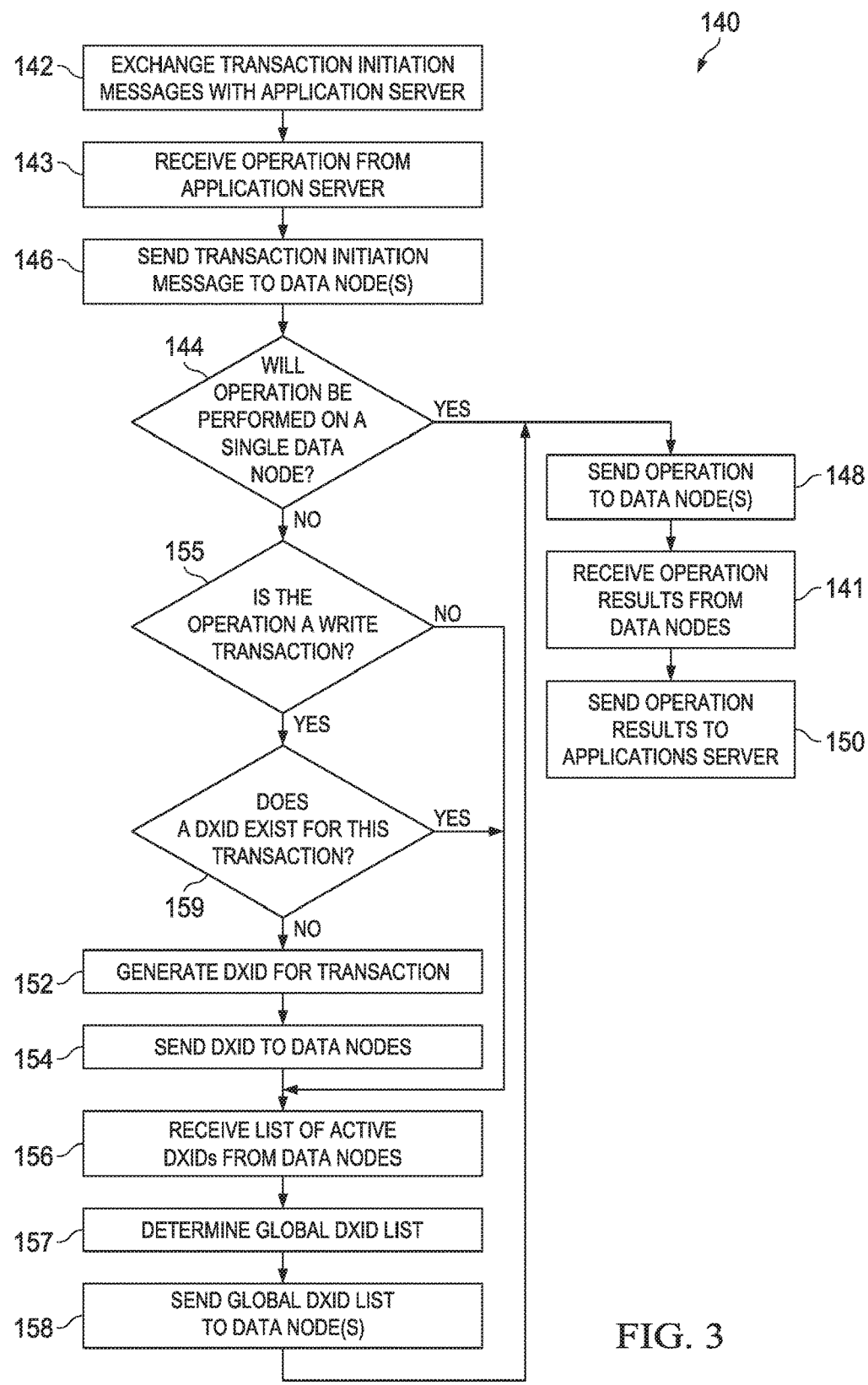
FIG. 3 illustrates a flowchart of an embodiment method for coordinating distributed operations within a transaction across a distributed database, performed by a coordinator.

FIG. 3 illustrates a flowchart of an embodiment method 140 for coordinating distributed operations within a transaction across a distributed database, performed by a coordinator. Initially, in block 142, the coordinator exchanges transaction initiation messages with an application server. The coordinator receives a transaction initiation message from the application server. In response, the coordinator sends an application response message to the application server. In block 143, the coordinator receives an operation from the application server. Then, in block 146, the coordinator sends a transaction assignment message to the data nodes assigned to the transaction. In one embodiment, the operation is only sent to the data nodes participating in the transaction, and is not sent to data nodes which are not participating in the transaction.

In block 144, the coordinator determines whether the operation will be performed on a single data node or on multiple data nodes. The coordinator will decide to perform the transaction on a single data node when resources are available on a single node to perform the transaction. On the other hand, the coordinator will decide to perform the transaction on multiple data nodes when the resources are not available to perform the transaction on a single data node. The coordinator may choose the fewest nodes which have sufficient resources to perform the transaction. When the operation will be performed on multiple data nodes, the coordinator proceeds to block 155 to determine whether the operation is a write transaction or a read transaction. On the other hand, when the operation will be performed on a single data node, the coordinator does not generate a DXID, and proceeds to block 148 to send operations to the data nodes. In some embodiments, the coordinator determines whether the operation is a read operation or a write operation before determining whether the operation is assigned to a single data node or to multiple data nodes.

In block 155, the coordinator determines whether the operation is a read operation or a write operation. When the operation is a read operation, the coordinator proceeds to block 156 to receive the active DXID lists from the data nodes, and does not create a DXID. On the other hand, when the transaction is a write transaction, the coordinator proceeds to block 159 to determine whether a DXID exits for this transaction. When a DXID exists for this transaction, the coordinator proceeds to block 156 to receive lists of active DXIDs from the data nodes. When a DXID does not exist for this transaction, the coordinator proceeds to block 152 to generate a DXID for the transaction. After generating the DXID in block 152, the coordinator, in block 154, sends the DXID to the data nodes. In an embodiment, the coordinator only sends the DXID to the data nodes participating in the transaction. Then, the coordinator proceeds to block 156. In one embodiment, the DXID is transmitted along with the operation assignment message.

In block 156, the coordinator receives a list of active DXIDs from the participating data nodes. Then, in block 157, the coordinator consolidates these individual DXID lists into a global DXID list. In block 158, the coordinator sends the global DXID list to the participating data nodes.

The coordinator then proceeds to block 148 to send operations to the data nodes. Then, in block 141, the coordinator receives operation results from the data nodes. After receiving the results from the data nodes in block 148, the coordinator proceeds to block 150 to send the transaction results to the application server.

FIG. 4 illustrates a flowchart for an embodiment method 290 of transaction committing performed by a coordinator. In an embodiment, the method 290 is performed after the method 140. In block 292, the coordinator receives a transaction commit message from the application server. The coordinator determines whether the transaction is a multi-node transaction or a single data node transaction, in block 304. When the transaction is a multi-node transaction, the coordinator proceeds to block 294 to perform a two-phase commit. On the other hand, when the transaction is a single data node transaction, the coordinator proceeds to block 306.

In block 306, the coordinator sends a transaction commit message to the data node. Then, the coordinator proceeds to block 300.

In block 294, the coordinator sends transaction prepare messages to the data nodes. In response, in block 296, the coordinator receives transaction prepare results from the data nodes. In block 298, the coordinator sends commit prepare messages to the data nodes. Then, the coordinator proceeds to block 300.

In block 300, the coordinator receives commit results from the data nodes. Then, in block 302, the coordinator sends the transaction results to the application server.

FIG. 5 illustrates a flowchart of an embodiment method 200 of snapshot coordination performed by a coordinator. In block 202, the coordinator receives the active DXID list from the participating data nodes. Then, in block 204, the coordinator generates a global DXID list from all of the data nodes, representing the global snapshot for active distributed transactions. The coordinator then sends the global snapshot to the data nodes in block 206.

FIG. 6 illustrates a flowchart for an embodiment method 230 of viewing data, performed by a data node. Initially, in block 232, the data node encounters apparently viewable data.

In block 234, the data node determines whether the transaction which created the data is a multi-node transaction or a single data node transaction. The coordinator may assign the transaction to a single data node when there is a single data node with sufficient nodes to perform the transaction. Otherwise, the coordinator assigns the transaction to multiple nodes. When the transaction which created the data is a single data node transaction, the data node proceeds to block 238, and the data is viewable. On the other hand, when the transaction which created the data is a multi-node transaction, the data node proceeds to block 236.

In block 236, the data node determines whether there is confirmation that the transaction which created the data is committed on all data nodes. When the transaction which created the data is committed on all data nodes, the data node proceeds to block 238, and the data is viewable. On the other hand, when the transaction which created the data is not committed on all data nodes, the data node proceeds to block 240 and waits. Then, the data node returns to block 236 to determine whether the transaction which created the data is now committed on all data nodes. When another concurrent process finishes the commit, the coordinator sends confirmation to the data nodes.

Figure 7:
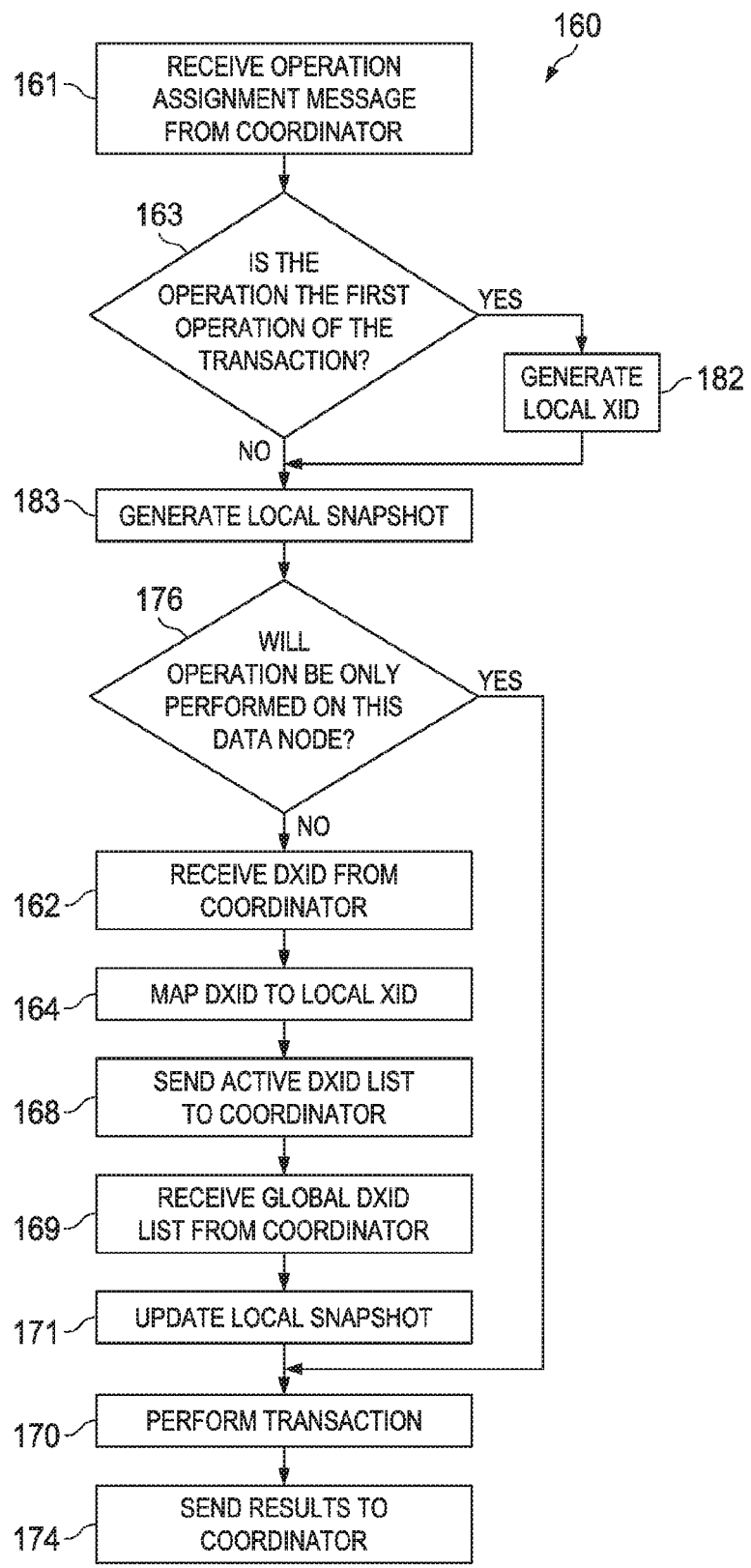
FIG. 7 illustrates a flowchart for an embodiment method of distributed database coordination performed by a data node.

FIG. 7 illustrates a flowchart for an embodiment method 160 of distributed database transactions performed by a data node. Initially, in block 161, the data node receives an operation assignment message from a coordinator. In block 163, the data node determines whether this operation is the first operation of the transaction. When this operation is not the first operation of the transaction, the data node proceeds to block 183 to generate a local snapshot. On the other hand, when the operation is the first operation of the transaction, the data node proceeds to block 182 to generate a local XID for the transaction. Then, the data node proceeds to block 183. In block 183, the data node generates a local snapshot, which contains a list of currently executing transactions on that data node which have not yet finished.

In block 176, the data node determines whether the operation will be only performed on this data node, or whether it is a distributed operation to be performed on multiple data nodes. The operation assignment message may indicate whether the operation is performed on a single data node or on multiple data nodes. When the operation is a single data node operation, the data node proceeds to block 170 to perform the operation. On the other hand, when the operation is a multi-node operation, the data node proceeds to block 162 to receive a DXID from the coordinator, where the DXID is a global identifier for the transaction.

The data node maps the DXID to a local XID in block 164. Also, this mapping is added to the local snapshot of the data node. In block 168, the data node sends the local snapshot to the coordinator. Then, in block 169, the data node receives the global snapshot from the coordinator. In block 171, the data node updates the local snapshot based on the global DXID list received from the coordinator.

Next, the data node performs the transaction in block 170. The data node may receive a global DXID snapshot from the coordinator. The global DXID snapshot depicts the global DXID mappings and the commit status of the other nodes. When encountering data which was created by a multi-node transaction, the current operation pauses until confirmation is received that the operation has committed on all participating data nodes. The data node may perform method 230 illustrated in FIG. 4 when encountering apparently viewable data.

After performing the transaction in block 170, the data node sends the operation results to the coordinator in block 174. The data node also sends an indication when the transaction commits on that data node.

Figure 8:
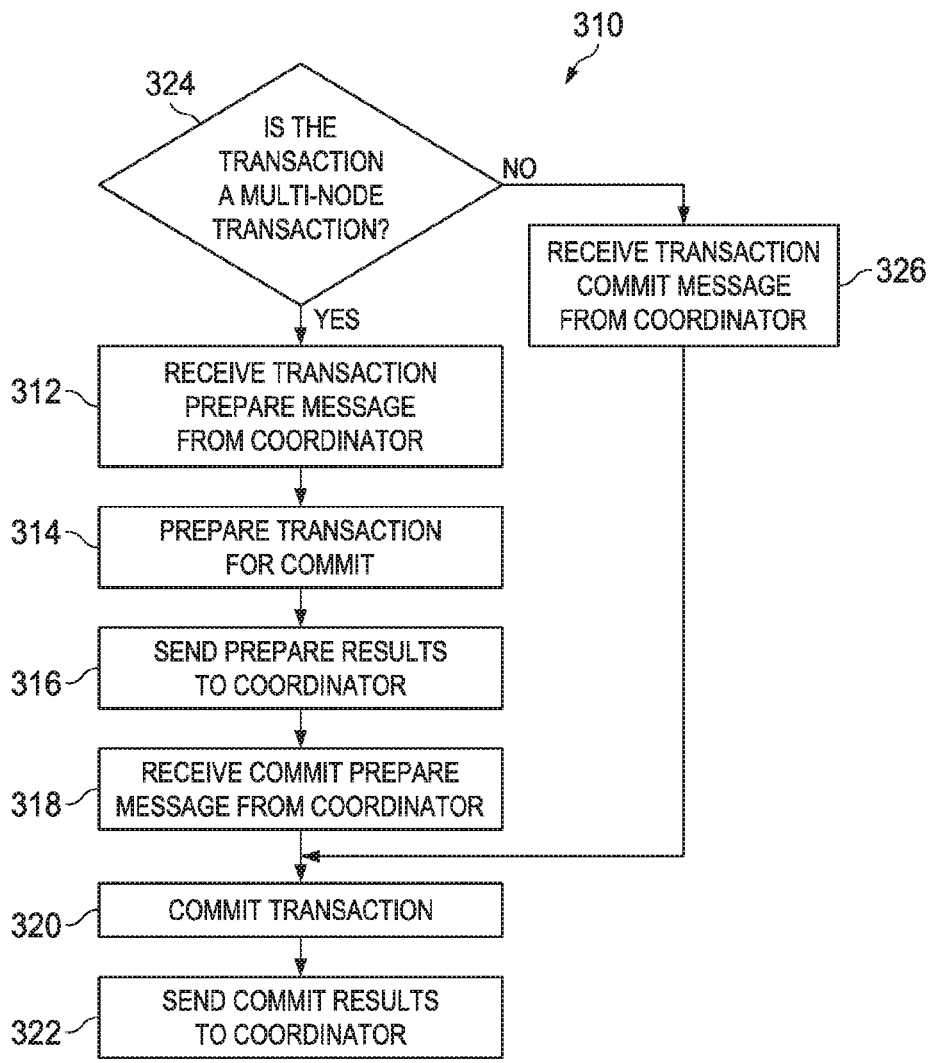
FIG. 8 illustrates a flowchart for an embodiment method of committing a transaction performed by a data node.

FIG. 8 illustrates a flowchart for an embodiment method 310 of committing a transaction performed by a data node which may be participating in a multi-node write transaction. In an embodiment, method 310 is performed after method 160. In block 324, the data node determines whether the transaction is a multi-node transaction or a single data node transaction. When the transaction is a single data node transaction, the data node proceeds to block 326, and receives a transaction commit message from the coordinator. The data node then proceeds to block 320 to commit the transaction. On the other hand, when the transaction is a multi-node transaction, the data node proceeds to block 312.

In block 312, the data node receives a transaction prepare message from the coordinator. Also, in block 314, the data node prepares a transaction for committing. Then, in block 316, the data nodes sends the prepare results to the coordinator. In block 318, the data node receives a commit prepare message from the coordinator.

In block 320, the data node commits the transaction. Then, in block 322, the data node sends the commit results to the coordinator.

Figure 9:
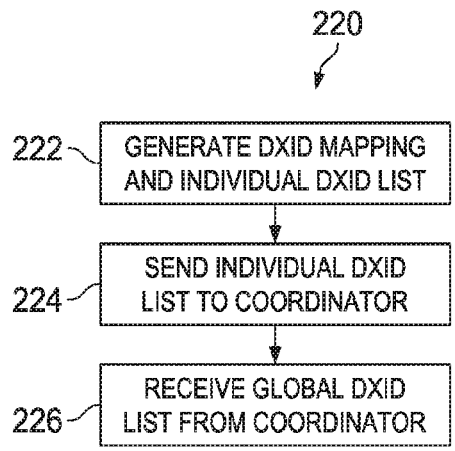
FIG. 9 illustrates a flowchart for an embodiment method of distributed transaction identifier (DXID) list generation performed by a data node.

FIG. 9 illustrates a flowchart for an embodiment method 220 of DXID list generation performed by a data node. In block 222, the data node generates a DXID mapping for DXIDs of active transactions and local XIDs corresponding to the DXIDs. The data node also generates an individual DXID list of DXIDs corresponding to active transactions on that data node. In block 224, the data node sends the individual DXID list to the coordinator. In block 226, the data node receives a global DXID list from the coordinator, which indicates the DXIDs for global transactions.

Figure 10:
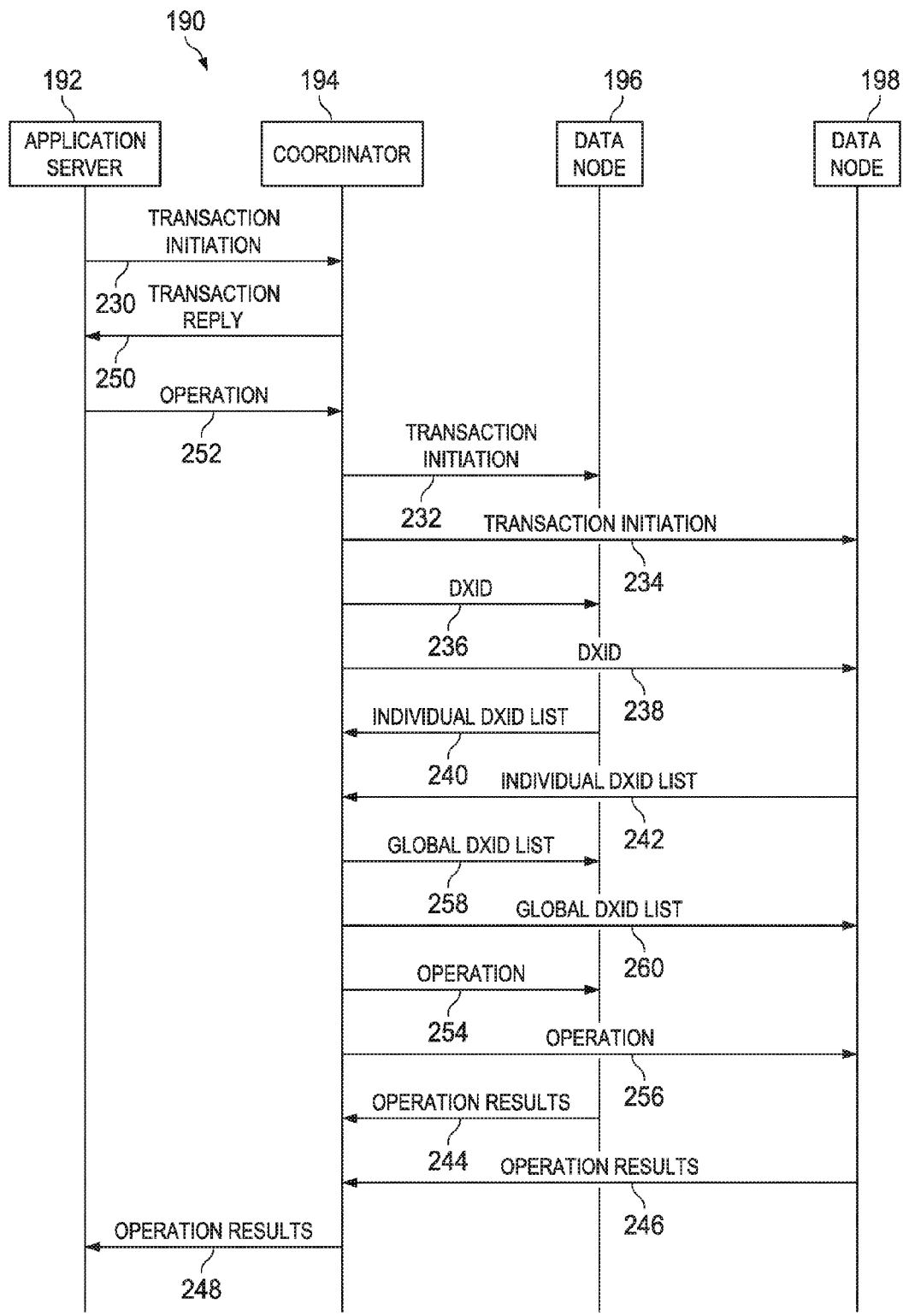
FIG. 10 illustrates a message diagram for an embodiment method of distributed database coordination.

FIG. 10 illustrates a message diagram for an embodiment method 190 of coordinating a distributed database transaction. The transaction may be initiated by an application running on the application server 192, or may be externally initiated and received by the application server 192. The application server 192 sends a transaction initiation message to the coordinator 194 in message 230. The coordinator 194 then sends a transaction reply 250 to the application server.

The application server 192 sends an operation 252 to the coordinator 194. The coordinator 194 then assigns the operation to one or more data nodes. In an embodiment, single data node transactions are preferred to multi-node transactions. In the example pictured, the operation is assigned to data node 196 and data node 198. The coordinator 194 sends transaction initiation messages to data node 196 in message 232 and to data node 198 in message 234.

In some situations, the coordinator 194 generates a DXID. In an embodiment, the coordinator 194 generates a DXID only for the first multi-node operation for the transaction. The DXID is sent by the coordinator to the data node 196 in message 236, and to the data node 198 in message 238.

The data nodes 196 and 198 produce individual DXID lists indicating the DXIDs of transactions which are active on those data nodes. The data nodes 196 and 198 then send these DXID lists to the coordinator 194 in the messages 240 and 242, respectively.

The coordinator 194 generates a global DXID list based on the individual DXID lists received from the data nodes 196 and 198. Then, the coordinator 194 sends the global DXID list to data node 196 in message 258, and to data node 198 in message 260.

The coordinator 194 sends an operation message to the data node 196 in message 254, and to the data node 198 in the message 256. Next, the data nodes 196 and 198 perform the operation. When the operation is complete, the data nodes 196 and 198 send the operation results to the coordinator 194 in message 244 and message 246, respectively. The coordinator 194 then coordinates the received operation results, and sends the operation results to the application server 192 in message 248.

Figure 11:
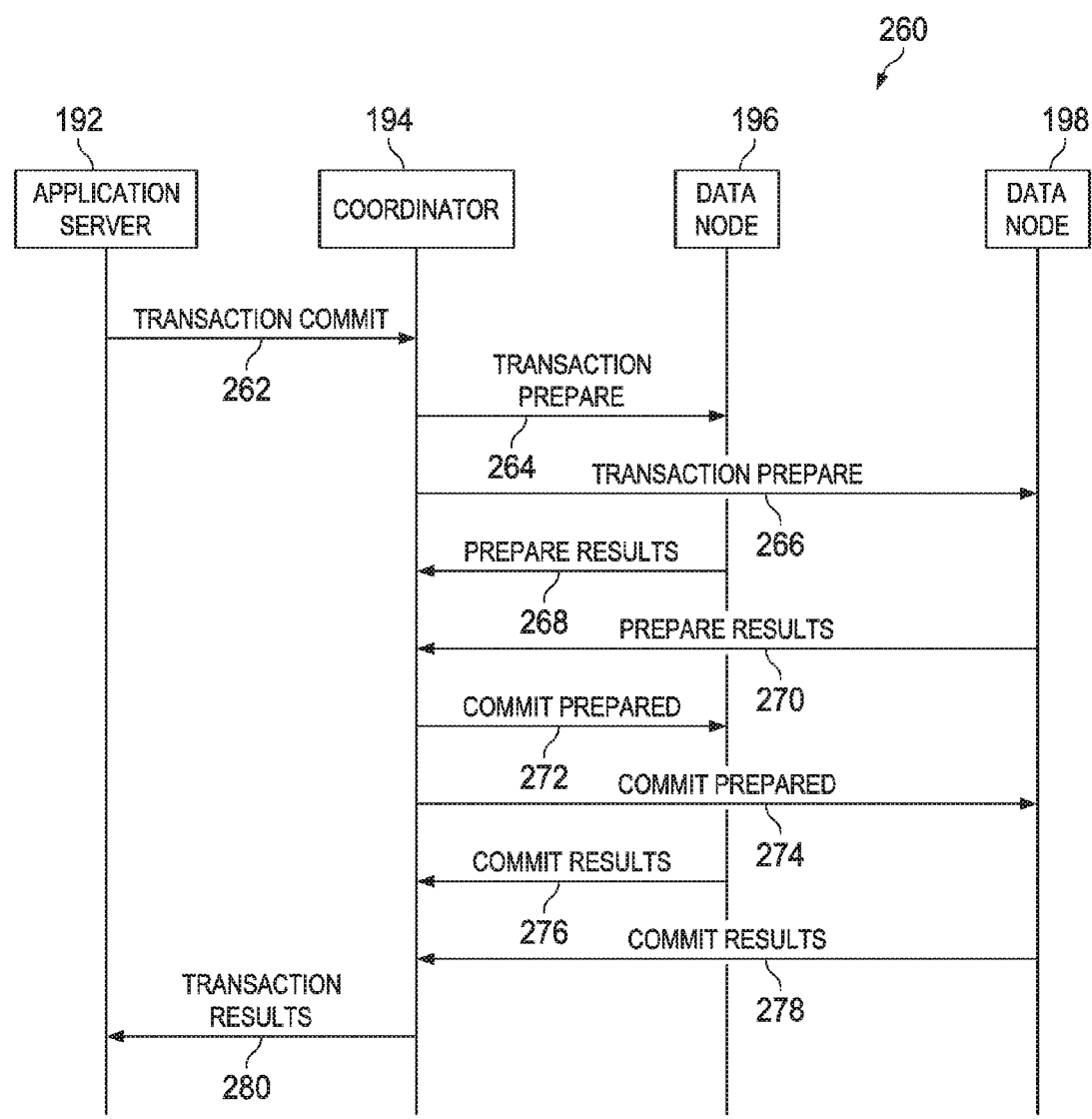
FIG. 11 illustrates a message diagram for another embodiment method of distributed database coordination when committing a multiple data node distributed write transaction.

FIG. 11 illustrates a message diagram for an embodiment method 260 of distributed database coordination when committing a multiple data node distributed write transaction. The application server 192 initiates a commit for a transaction, and sends an indication of the transaction commit to the coordinator 194 in message 260. The coordinator 194 then sends the transaction prepare message 264 to the data node 196, and sends the transaction prepare message 266 to the data node 198.

The data nodes 196 and 198 generate prepare results. The data node 196 sends the prepare results message 268 to the coordinator, and the data node 198 sends the prepare results message 270 to the coordinator 194.

The coordinator 194 determines whether the commit is prepared. When the commit is prepared, the coordinator 194 sends a commit prepare message 272 to the data node 196, and sends a commit prepare message 274 to the data node 198.

The data nodes 196 and 198 commit the transaction and generate commit results. The data node 196 sends the commit results 276 to the coordinator 194, and the data node 198 sends the commit results 278 to the coordinator 194.

The coordinator 194 generates transaction results from the commit results. Then, the coordinator 194 sends the transaction results 280 to the application server 192.

Figure 12:
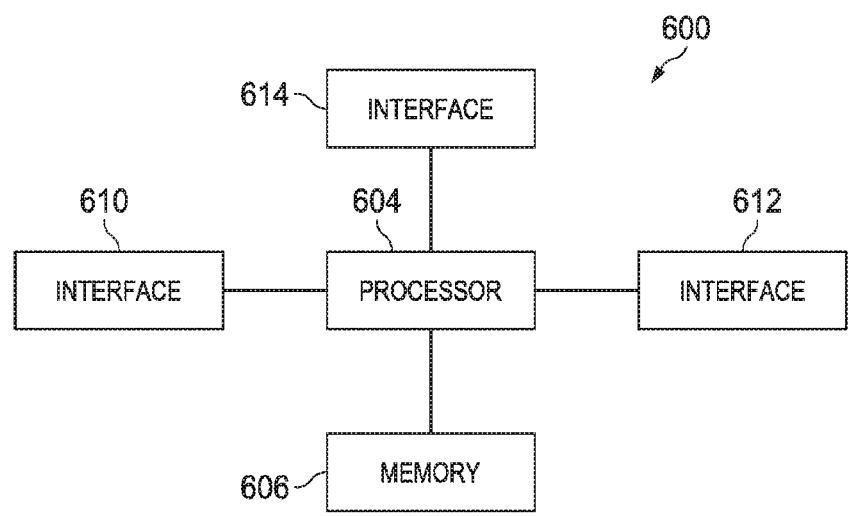
FIG. 12 illustrates an embodiment block diagram of an embodiment processing system.

FIG. 12 illustrates a block diagram of an embodiment processing system 600 for performing methods described herein, which may be installed in a host device. As shown, the processing system 600 includes a processor 604, a memory 606, and interfaces 610-614, which may (or may not) be arranged as shown in FIG. 12. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in FIG. 12, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an application server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 13:
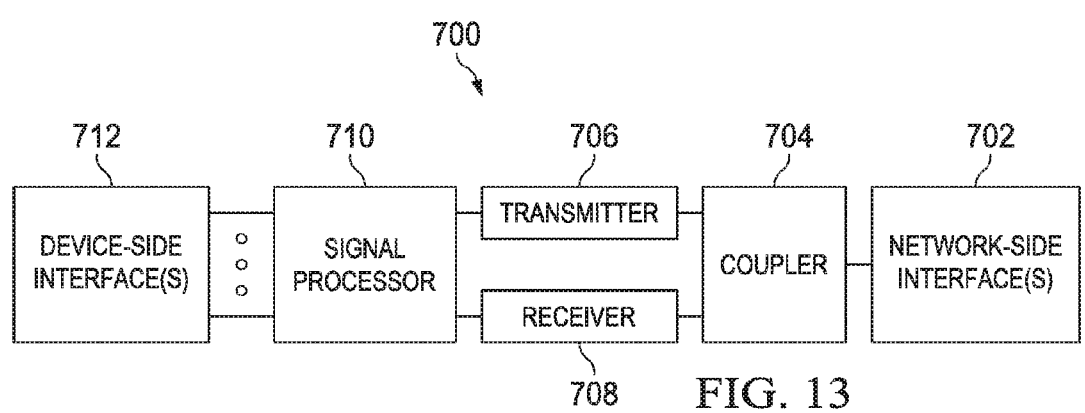
FIG. 13 illustrates an embodiment block diagram of an embodiment transceiver.

In some embodiments, one or more of the interfaces 610, 612, 614 connects the processing system 600 to a transceiver adapted to send and receive signaling over the telecommunications network. FIG. 13 illustrates a block diagram of a transceiver 700 adapted to send and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for maintaining consistency in distributed databases, comprising:
generating, by a coordinator, a distributed transaction identifier (DXID) for a transaction initiated from an application server;
sending, by the coordinator, the DXID to a first data node and a second data node;
receiving, by the coordinator, a respective local database snapshot from each data node indicating active transactions at each data node, each local database snapshot comprising a list of active DXIDs including the DIXD for the transaction to the respective node;
generating, by the coordinator, a combined global list of DXIDs from the list of active DXIDs received from each data node;
sending, by the coordinator, the combined global list of DXIDs to each data node, prompting each data node to update the local database snapshot to include transactions not yet committed on other nodes; and
sending, by the coordinator, transaction results to the application server.

2. The method of claim 1, further comprising:
sending, by the coordinator, transaction initiation messages to the first data node and the second data node.

3. The method of claim 1, further comprising generating the DXID based on determining that the transaction is a write transaction.

4. The method of claim 1, further comprising:
receiving, by the coordinator, a first DXID list from the first data node and a second DXID list from the second data node, the first DXID list listing a first set of DXIDs active on the first data node, and the second DXID list listing a second set of DXIDs active on the second data node; and
transmitting, by the coordinator, a global DXID list to both the first data node and the second data node, the global DXID list indicating that the first set of DXIDs are active on the first data node and that the second set of DXIDs are active on the second data node.

5. The method of claim 1, further comprising:
determining that the DXID does not already exist for the transaction, the DXID being generated in response to determining that the DXID does not already exist for the transaction.

6. The method of claim 1, further comprising:
sending, by the coordinator, a first operation request to the first data node and a second operation request to the second data node;
receiving, by the coordinator, a first operation result from the first data node and a second operation result from the second data node; and
sending, by the coordinator, the first operation result and the second operation result to an application server.

7. The method of claim 1, further comprising:
sending, by the coordinator, a transaction response message to the application server; and
receiving, by the coordinator, an operation command message from the application server.

8. The method of claim 1, further comprising:
receiving, by the coordinator, a transaction commit message for the transaction from an application server;
performing a two phase commit in response to receiving the transaction commit message; and
sending, by the coordinator, transaction results to the application server.

9. The method of claim 8, wherein performing the two phase commit comprises:
sending, by the coordinator, a first transaction prepare message to the first data node and a second transaction prepare message to the second data node;
receiving, by the coordinator, a first transaction prepare result from the first data node and a second transaction prepare result from the second data node;
sending, by the coordinator, a first commit prepare message to the first data node and a second commit prepare message to the second data node; and
receiving, by the coordinator, a first commit result from the first data node and a second commit result from the second data node.

10. A coordinator for maintaining consistency in distributed databases, comprising:
a non-transitory memory storage comprising instructions; and
one or more processors in communication with the non-transitory memory storage, wherein the one or more processors execute the instructions to:
generate a distributed transaction identifier (DXID) for a transaction initiated from an application server;
send the DXID to multiple data nodes;
receive a respective local database snapshot from each data node indicating active transactions at each data node, each local database snapshot comprising a list of active DXIDs including the DXID for the transaction to the respective node;
generate a combined global list of DXIDs from the list of active DXIDs received from each data node;
send the combined global list of DXIDs to each data node, prompting each data node to update the local database snapshot to include transactions not yet committed on other nodes; and send transaction results to the application server.

11. A method for maintaining consistency in distributed databases, comprising:

receiving, by a data node in a distributed database, a distributed transaction identifier (DXID) for a transaction from a distributed coordinator;

sending, by the data node, a local database snapshot to the distributed coordinator indicating active transactions at the data node, the local database snapshot comprising a list of active DXIDs including the DXID for the transaction;

receiving, by the data node, a combined global list of DXIDs from the distributed coordinator comprising a combined list of active DXIDs from active data nodes in the distributed database; and updating, by the data node, the local database snapshot to include transactions not yet committed by the active data nodes.

12. The method of claim 11, further comprising receiving, by the data node, an operation initiating message instructing the data node to operate on the transaction.

13. The method of claim 11, wherein receiving the DXID for the transaction comprises receiving the DXID for the transaction, and based thereon, generating, by the data node, a local transaction ID (LXID), the method further comprising mapping, by the data node, the DXID to the LXID.

14. The method of claim 11, further comprising sending, by the data node, commit results to the distributed coordinator.

15. The method of claim 1, further comprising assigning, by the coordinator, a first operation and a second operation, respectively, to the first data node and the second data node, the assigning based on resource requirements of each operation and available resources at each node.

16. The coordinator of claim 10, wherein the one or more processors execute the instructions to assign a first operation and a second operation, respectively, to a first data node and a second data node of the multiple data nodes, the assignment based on resource requirements of each operation and available resources at each node.

17. The coordinator of claim 10, wherein the one or more processors execute the instructions to send an operation initiating message to each data node instructing each data node to perform an operation on the transaction.

18. The coordinator of claim 10, wherein the one or more processors execute the instructions to:

receive a transaction commit message from the application server;

determine that the transaction is a multi-node transaction, and based thereon, perform a two-phase commit;

send a respective commit prepared messages to each data node; and receive a corresponding commit result message from each data node.

19. The coordinator of claim 10, wherein the one or more processors execute the instructions to generate the DXID for the transaction based on determining that the transaction is a write transaction.

20. The coordinator of claim 10, wherein the one or more processors execute the instructions to:

send a transaction response message to the application server; and receive an operation command message from the application server.

* * * * *